United States Patent Office 3,674,469
Patented July 4, 1972

3,674,469
WELDING ELECTRODE
Richard C. Stewart, Edwardsville, Ill., and Edward L. Creamer, St. Louis, Mo., assignors to Shell Oil Company, New York, N.Y.
No Drawing. Continuation of abandoned application Ser. No. 733,294, May 31, 1968. This application Dec. 30, 1970, Ser. No. 102,995
Int. Cl. C22c 37/10
U.S. Cl. 75—124                                                  4 Claims

ABSTRACT OF THE DISCLOSURE

The present invention relates to an improved method of welding 10–20% chromium stainless steels with a new and novel matching welding electrode containing from about 0.1% to about 5% titanium.

---

This application is a continuation of application Ser. No. 733,294 filed May 31, 1968, now abandoned.

BACKGROUND OF THE INVENTION

It is known in the art that welding certain stainless steels such as ferritic chromium stainless steels with conventional electrodes, such as the AWS type E410 electrode, generally results in brittle weldments and necessitates post-weld heat treatment in order to attain required hardness and toughness levels. The problem becomes particularly complicated when such electrodes are used for welding chromium stainless steel containing between about 10% and about 20% chromium, such as AISI 405 and 430 ferritic chromium stainless steels with conventional 12% chromium stainless steel electrodes since undesirable brittle weldments are obtained and post-weld heat treatment is necessitated. The problem is particularly severe when welding is required in fabrication of AISI 405, 430, 430A and 430B ferritic chromium stainless steels containing from about 10% to 20%, preferably between 11.5% and 18% chromium as used, for example, in welding fabricated fractionation columns, hydrotreaters, hydrocrackers, heat exchanges liners for reaction vessels, e.g., clad pressure vessels, pipes, tubes, e.g., furnace tubes, and the like. Weldments resulting from welding fabricated equipment as mentioned must be tough, flexible and ductile, since such equipment is subjected to great stresses and strains under severe temperature and pressure conditions. With conventional welding electrodes as mentioned above when used to weld ferritic stainless steels, post-weld heat treatment is required. If post-weld heat treatment can be eliminated and at the same time the welded steel possess the required toughness and ductility properties, great economic benefits can be obtained.

The current use of ASTM A298 AWS–ASTM classification E410 electrodes for welding AISI Type 405 stainless steel produces hard welds requiring post-weld heat treatment. To eliminate this heat treatment, electrodes containing high concentrations of nickel (austenitic stainless steels, proprietary alloys of International Nickel Co., etc.) are often used. This practice results in a mismatch of weld and base metal which is often undesirable.

An object of the present invention is to provide a welding electrode capable of welding ferritic 10–20% chromium stainless steel so that the weldments produce tough, flexible and ductile weldments and joints. A further object of the present invention is to provide a welding electrode for AISI 405 and 430 chromium steel in which the weldments form an essentially homogeneous single-phased microstructure which is tough and ductile and capable of withstanding great stresses and strains without the necessity of post heat treatment. Still anoher object is to eliminate the necessity for heat treatment of steels welded with welding electrodes of this invention.

EMBODIMENT OF THE INVENTION

It has now been discovered that the above objects can be obtained when welding ferritic stainless steel, such as AISI 405, 430 ferritic stainless steels, which generally contain between 11.5% and 18% chromium, with welding electrodes of the AWS type such as E410 or E430 modified by incorporation or addition of from about 0.1% to about 5% and preferably between about 0.5% and about 4% titanium.

The preferred embodiment of the present invention is directed to the welding of types AISI 405 and 430 ferritic chromium stainless steels such as are used in making furnace tubes, clad pressure vessels, piping for hydrotreaters and hydrocrackers and having the following compositions:

Ferritic steel

AISI 405:
    C=0.08% w. max.
    Mn=1% w. max.
    P=0.040% w. max.
    S=0.030% w. max.
    Si=1% w. max.
    Cr.=11.5–14.5% w.
    Ni=0.6% w. max.
    Al=0.1–0.3% w.

AISI 430A:
    0.12% w. max.
    1.0% w. max.
    0.040% w. max.
    0.030% w. max.
    1.0% w. max.
    14.00–16.00% w.
    0.75% w. max.

AISI 430B:
    0.12% w. max.
    1.0% w. max.
    0.040% w. max.
    0.030% w. max.
    1.0% w. max.
    16.00–18.00% w.
    0.75% w. max.

with AWS type E410 or E430 electrodes modified to incorporate from about 0.5% to about 4% w. of titanium.

Welding electrodes of this invention are illustrated by the following examples:

Electrode A stainless steel containing:
- Cr.=11–13.5% w.
- Si=0.90% w. max.
- S=0.03% w. max.
- P=0.04% w. max.
- Mn=1% w. max.
- C=0.12% w. max.
- Ni=0.50% w. max.
- Ti=1.0–4.0% w.
- Fe=balance Electrode B stainless steel containing:
- Cr=11–13.5% w.
- Si=0.9% w. max.
- S=0.03% w. max.
- P=0.04% w. max.
- Mn=1% w. max.
- C=0.05% w. max.
- Ti=2% w.
- Fe=balance Electrode C stainless steel containing:
- Cr=11–13.5% w.
- Si=0.9% w. max.
- S=0.03% w. max.
- P=0.04 w. max.
- Mn=1% w. max.
- C=0.09–0.11% w.
- Ti=1% w.
- Fe=balance Electrode D stainless steel containing:
- Cr=11–13.5% w.
- Si=0.90% w. max.
- S=0.03% w. max.
- P=0.04% w. max.
- Mn=1% w. max.
- C=0.09–0.11% w.
- Ti=4% w.
- Fe=balance Still other stainless steel electrodes suitable in the practice of the present invention are commecial 12% Cr electrodes such as "Airco 12 Cr Electrode" modified by incorporation of from 0.5 to 4% of Ti and which herein is referred to as Electrode E or McKay, Alloy or Murex E410 Electrodes, also modified by incorporation of from 0.5 to 4% of Ti and referred to herein as Electrodes F, G, and H, respectively. A commercial Airco electrode that was analyzed prior to modification contained 0.08% C.; 13.2% Cr; 0.82% Mn; 0.09% Mo and 0.24% Ni; while the McKay, Alloy and Murex electrodes that were analyzed differed from the Airco electrode in the basic Ni content which was 0.35%, 0.34% and 0.03% Ni, respectively.

The method of making titanium modified 10–18% (11–14.5%) Cr stainless steel electrodes and wires can be by any suitable means known to the art, such as described in the reference book "Welding Metallurgy" by George E. Linnert, vol. 2, published by the American Welding Society, New York, 1967, or any other suitable means.

It is essential to the present invention when welding steels such as AISI 405 or 430 steels with essentially titanium modified 12% Cr stainless steel electrodes of the present invention, that the titanium content of said electrodes be above 0.5%. Electrodes of the type under discussion in which the Ti content is below the range specified, form weldments which are inferior in many respects. For example, if the Ti content is below 0.5% w., the deposited weld metal will partially re-transform to martensite which is hard and brittle. If weld metal compositions of the present invention are used, however, the weld deposit will not transform to martensite but will remain as the relatively soft ferrite. Therefore, weldments formed by use of electrodes of the present invention which are not hard and brittle are excellent for joining AISI 405 and 430 stainless steels, and by the use of welding electrodes of this invention the necessity of post-weld heat treatment is eliminated.

The method of preparing surfaces and joints to be welded and the method of welding them can be varied to suit the situation and manual or automatic welding machines can be used provided the metals and electrodes used are of the types under discussion. Such methods and means are well known to the art and some are discussed in the July 1965 issue of The Brown Boveri Review. After the welding step the metal need not be post-weld heat-treated or tempered or normalized by standard procedures.

PREFERRED EMBODIMENT OF THE INVENTION

To illustrate the invention, type 410 stainless steel castings containing 1–4% Ti were prepared to simulate weld deposits of this invention. In the as-cast or as-quenched condition these castings are comparable in hardness to type 405 wrought stainless steel as noted in Table 1.

TABLE 1

[Hardness values of titanium-containing type 410 stainless steel]

| Titanium addition, percent w. | Hardness, Brinell | |
|---|---|---|
| | As cast [1] | Quenched [2] |
| 1.0 | 169 | 157 |
| 2.0 | 193 | 176 |
| 4.0 | 228 | 216 |

[1] Cast in water-cooled copper crucibles.
[2] Quenched in oil from 1,800° F.

Improved resistance to hardening of the heat-affected zone of welded stainless steels such as AISI 410 can be also attained by addition thereto of from 0.5–4% titanium and welding with matching titanium-modified electrodes of the present invention.

Welds made with titanium-modified electrodes of this invention, e.g., Electrode A as described, are sufficiently soft to resist weld cracking without the necessity of post-weld heat treatment.

We claim is our invention:

1. A matching welding electrode composition for AISI 405 stainless steel containing the following components:

- C=0.88% w. max.
- Mn=1% w. max.
- P=0.040% w. max.
- S=0.030% w. max.
- Si=1% w. max.
- Cr=11.5–14.5% w.
- Ni=0.6% w. max.
- Al=0.1–0.3% w.

the balance being Fe and to which has been incorporated from about 1% to about 4% wt. Ti.

2. The matching welding electrode of claim 1, the composition of which is:

- Cr=11–13.5% w.
- Si=0.9% w. max.
- S=0.03% w. max.
- P=0.04% w. max.
- Mn=1% w. max.
- C=0.05% w. max.
- Ti=2% w.
- Fe=balance.

3. The matching welding electrode of claim 1, the composition of which is:

Cr=11–13.5% w.
Si=0.9% w. max.
S=0.03% w. max.
P=0.04% w. max.
Mn=1% w. max.
C=0.09–0.11% w.
Ti=1% w.
Fe=balance.

4. The matching welding electrode of claim 1, the composition of which is:

Cr=11–13.5% w.
Si=0.90% w. max.
S=0.03% w. max.
P=0.04% w. max.
Mn=1% w. max.
C=0.09–0.11% w.
Ti=4% w.
Fe=balance.

References Cited

UNITED STATES PATENTS

| | | | |
|---|---|---|---|
| 2,848,323 | 8/1958 | Harris | 75—126 D |
| 3,243,287 | 3/1966 | Lillys | 75—124 |
| 3,250,611 | 5/1966 | Lula | 75—126 D |

HYLAND BIZOT, Primary Examiner

U.S. Cl. X.R.

75—126 D, 128 T